Figure 6:
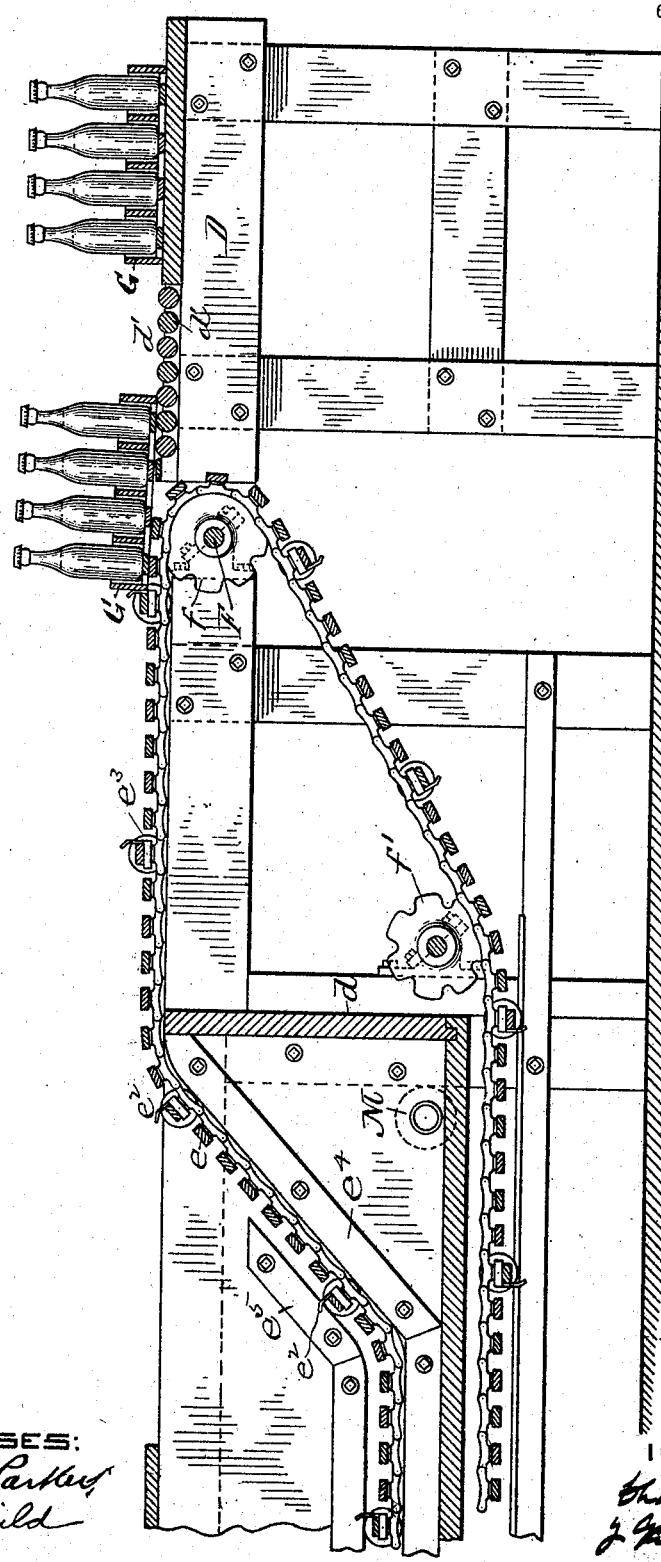

No. 806,266. PATENTED DEC. 5, 1905.
C. A. KING.
MACHINE FOR PASTEURIZING BEER.
APPLICATION FILED JULY 20, 1899.
6 SHEETS—SHEET 1.
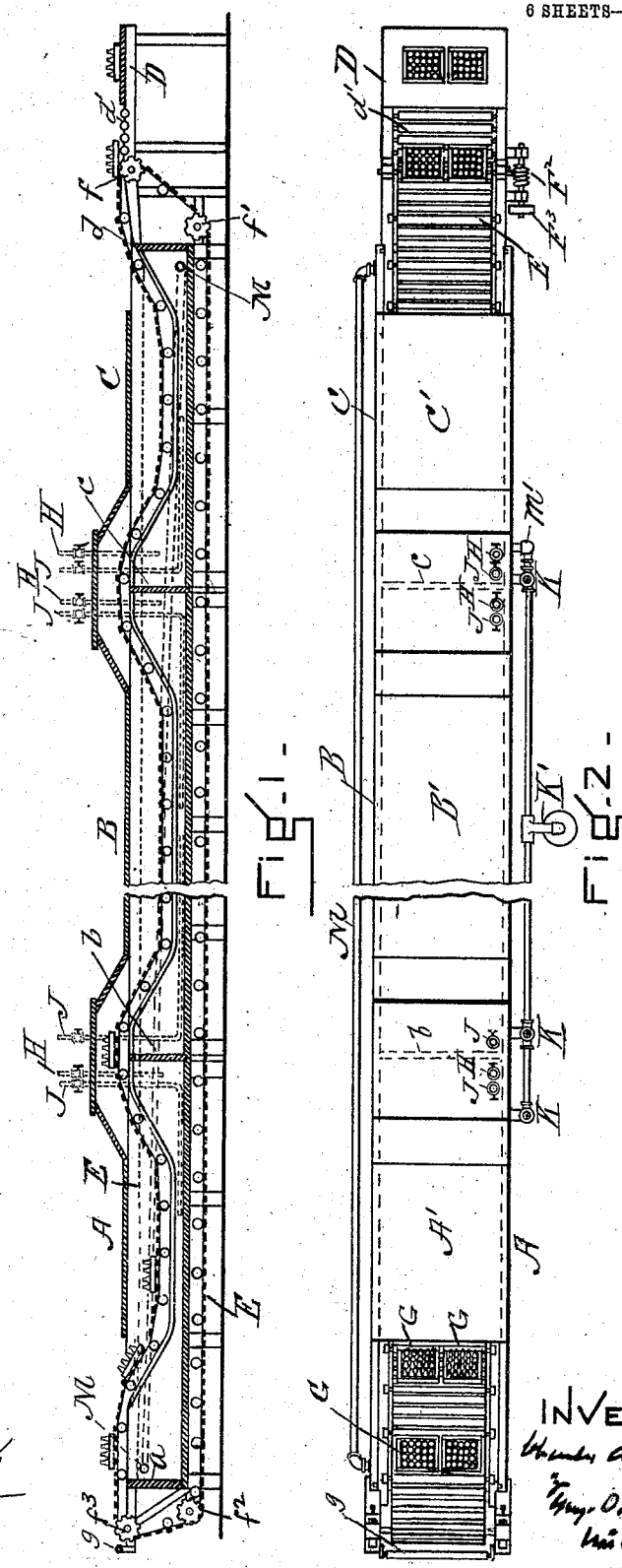

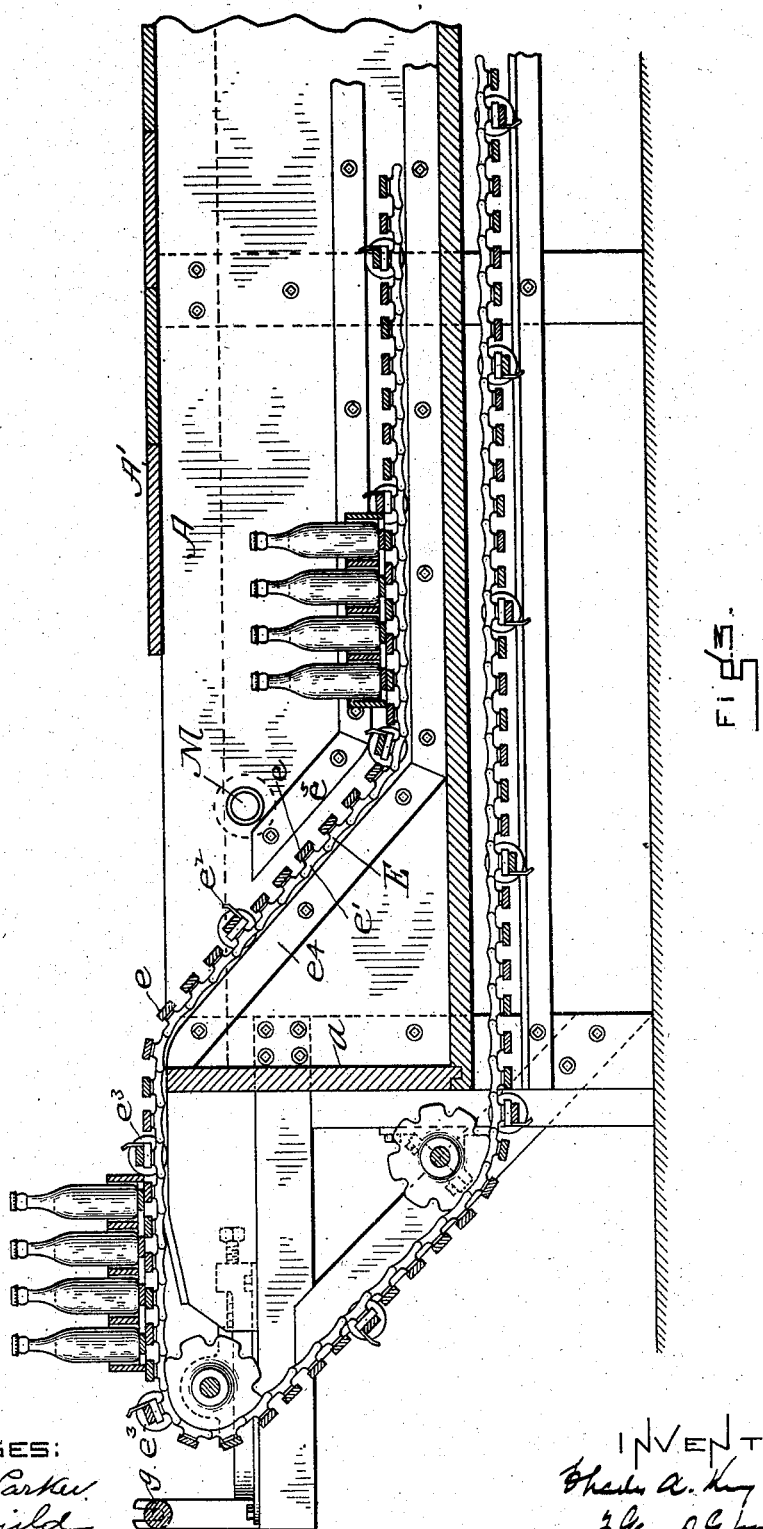

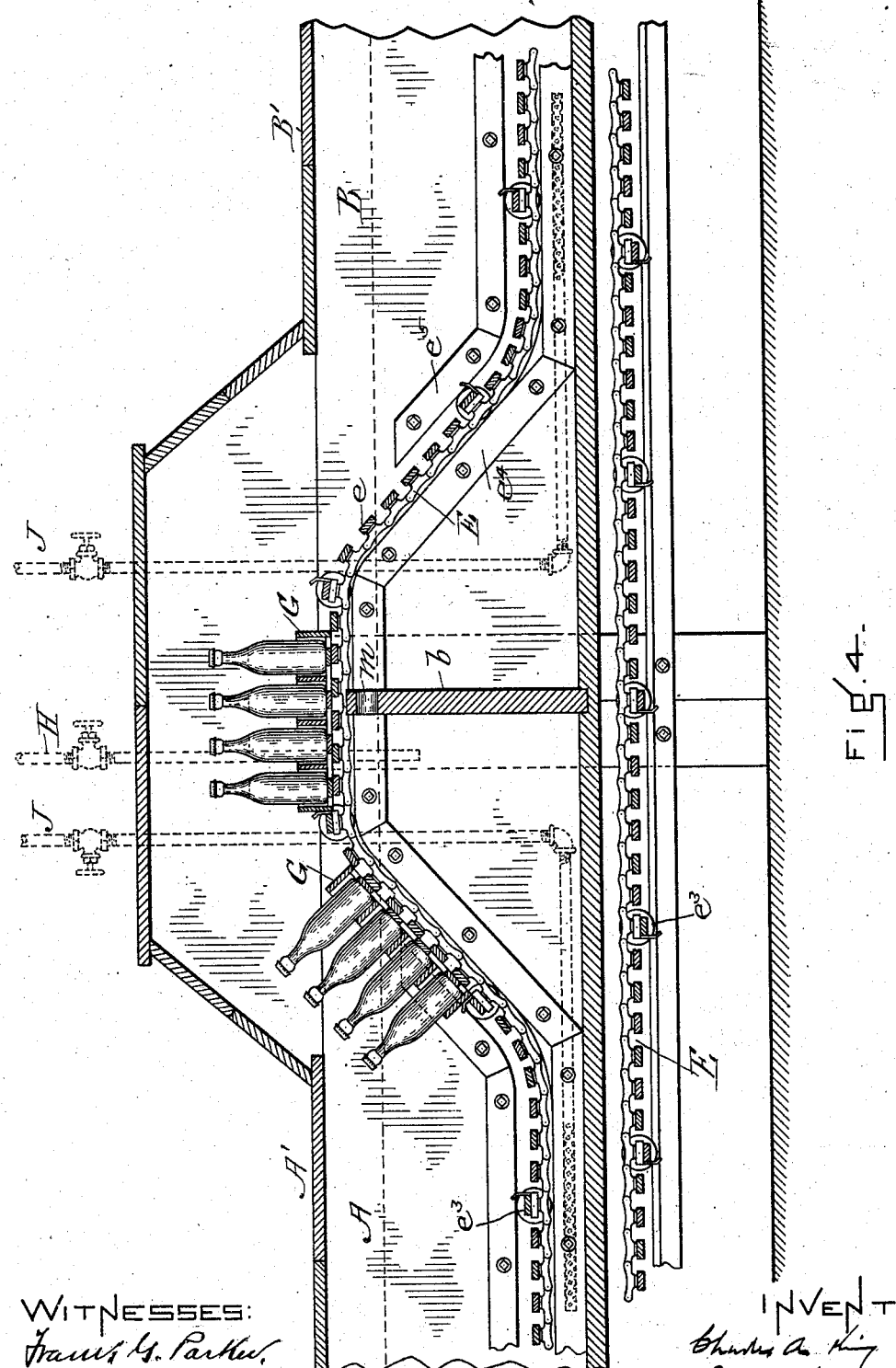

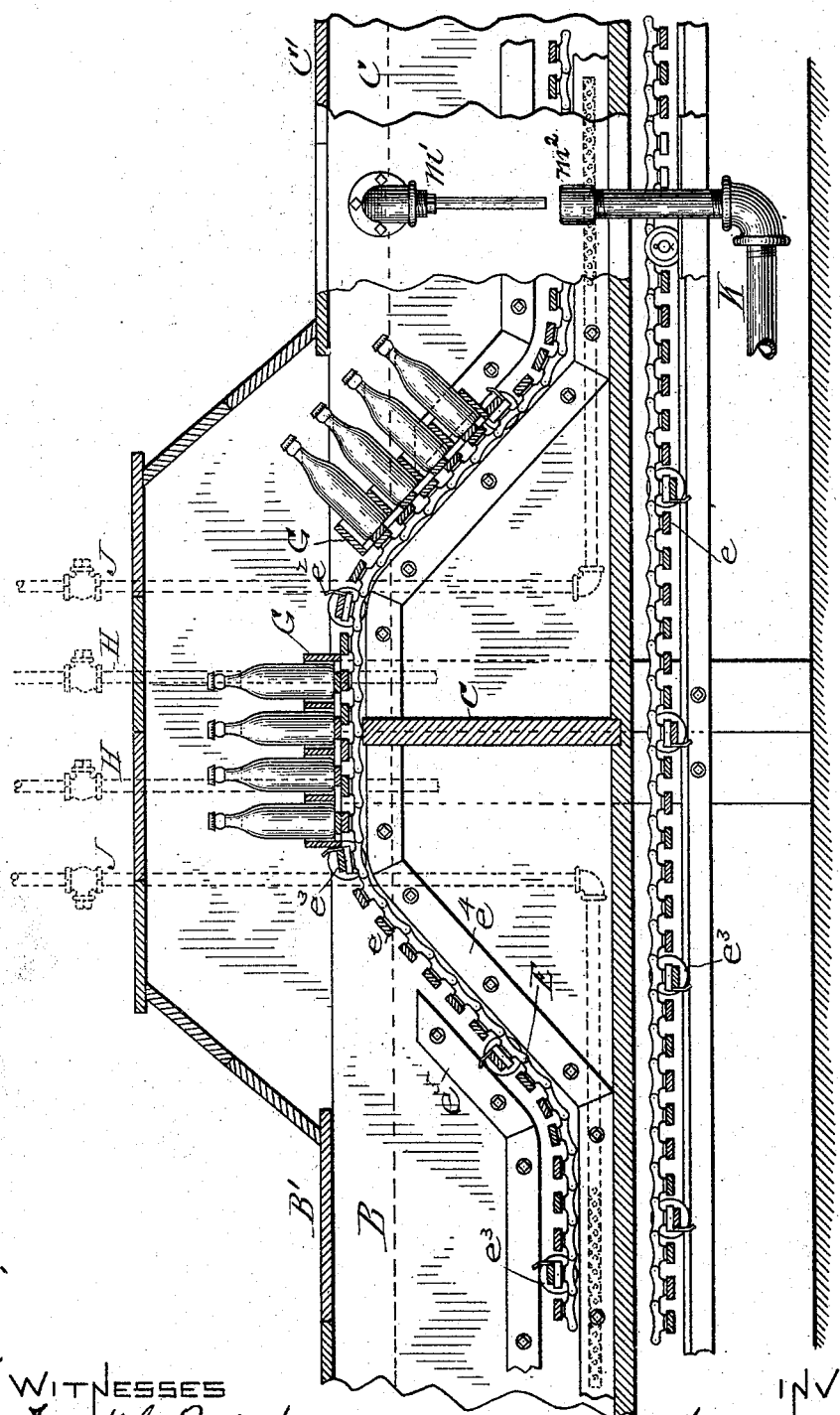

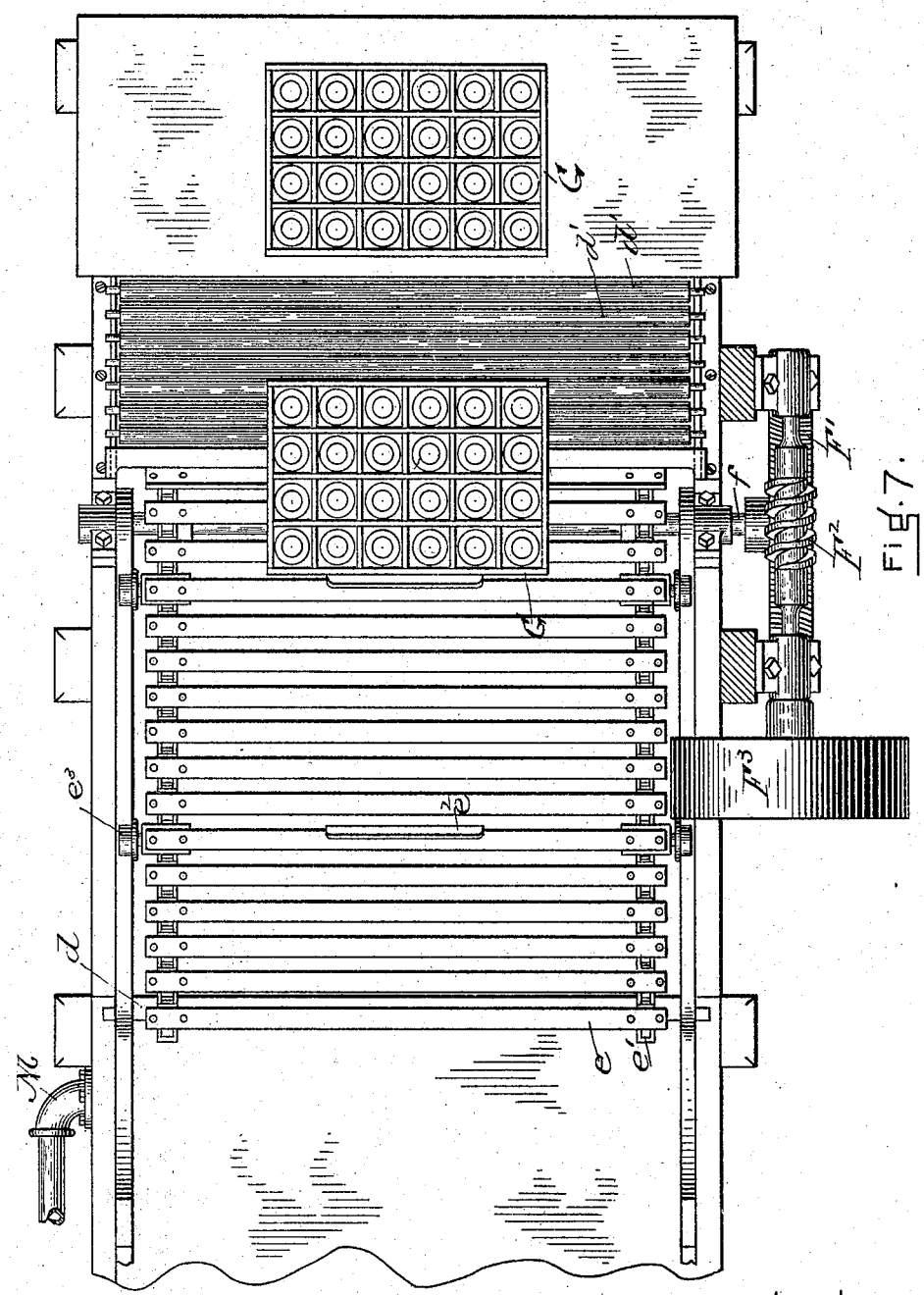

UNITED STATES PATENT OFFICE.

CHARLES A. KING, OF MATTAPOISETT, MASSACHUSETTS.

MACHINE FOR PASTEURIZING BEER.

No. 806,266.          Specification of Letters Patent.          Patented Dec. 5, 1905.

Application filed July 20, 1899. Serial No. 724,516.

*To all whom it may concern:*

Be it known that I, CHARLES A. KING, of Mattapoisett, in the county of Plymouth and State of Massachusetts, have invented a new and useful Improvement in Machines Especially Adapted for Pasteurizing Beer, of which the following is a specification.

My invention has for its object the production of a machine whereby bottled beer may be expeditiously and economically pasteurized.

The pasteurization of the bottled beer to destroy yeast-germs, &c., is ordinarily accomplished by heat applied to the bottles. To this end a pasteurizing temperature of at least 160° Fahrenheit is required, and in order that the bottles may not be broken in the operation the heat must be gradually applied and the bottles gradually cooled subsequently thereto. Water-baths of varying temperatures, into which the bottles are successively plunged, are favored in the art as a means of pasteurization because of the ease with which uniformity in the determination and maintenance of the proper temperatures is thereby secured. Ordinarily machines of this water-tank type comprise several tanks or baths, the pasteurizing-bath being a central tank maintained at a temperature of 160° Fahrenheit or over, while attemperating and cooling baths on either side thereof are maintained at temperatures considerably lower—say 90° Fahrenheit. In operation the bottles entering the first or warming bath at atmospheric temperature are heated therein to substantially the temperature of that bath and are then passed into the pasteurizing-bath to be heated to the higher or pasteurizing temperature. Thence passing to a third or cooling bath the temperature of the bottles is again lowered, whereupon they are then passed out of the machine. The bottles, however, on entering the first and second of these tanks naturally act to lower the temperatures thereof and upon entering the last-named tank to raise the temperature of that one. This action of the heat of the bottles to modify the required bath temperatures is ordinarily counteracted by a continuous application of heat to the first tank, as well as to the pasteurizing-tank, and by a simultaneous cooling of the last tank, these operations being independent in the sense that there is no automatic adjustment of temperature between the baths. I have conceived that in an apparatus of this type by placing the attemperating-tank and cooling-tank in proper relation to each other and to the pasteurizing-tank there may be produced a substantial equalization of temperature in the attemperating-tank and in the cooling-tank and that such condition may be continued without the further application of heat other than that admitted to the pasteurizing-tank. Accordingly I have constructed a machine which, briefly, comprises the three tanks in alinement, a bottle-carrier passing longitudinally through them, and in addition a communication from the pasteurizing-tank to the warming-tank, a communication from a point of the warming-tank remote from the pasteurizing-tank to the bottom of the cooling-tank, and an overflow from the cooling-tank. The pasteurizing-bath I maintain at a constant temperature in the usual way by the injection of steam. Although in this machine the action of the water-currents whereby the heat is transmitted from tank to tank is to me not entirely certain, the logical explanation is as follows: The steam condensing in the pasturizing-tank increases the volume of water therein, and this tank being in connection with the first tank a current of hot water enters the latter and tends to neutralize the cooling effect of the cold bottles entering therein. The portion of the warming-bath remote from the pasteuring-tank is of course least affected by the incoming current of hot water, and therefore tends to assume a lower temperature than the rest of that bath. From this point of the warming-tank, however, is the communication to the cooling-tank, and by reason of the increase in volume in the former, owing to the hot-water current mentioned, a current to the latter takes place. Such current being from the colder portion of the warming-bath tends on entering the cooling-tank to neutralize the heating effect of the bottles coming from the pasteurizing-tank, and the cold water from the warming-tank entering the bottom of the cooling-tank raises the water-level thereof and causes the hotter water at the surface to overflow to the waste-pipe.

Having set forth the general principle of my invention and my embodiment of the same, I will now describe the invention in detail, reference being had to the accompanying drawings, in which—

Figure 1 is a broken longitudinal diagrammatic section of an apparatus embodying my invention, Fig. 2 being a plan thereof. Fig. 3 is a sectional view of the left-hand end of the apparatus, showing a portion of the first tank. Fig. 4 is a sectional view showing the arrangement of parts at the division between the first and second tanks. Fig. 5 is a corresponding view taken at the division between the second and third tanks. Fig. 6 is a sectional view showing the right-hand end of the apparatus; and Fig. 7 is a plan view of the receiving-table at the right of Figs. 1 and 2 showing also a portion of the conveyer in plan.

Referring to the drawings, my machine is shown as a long trough-like structure with end walls $a$ and $d$ and partitions at $b$ and $c$ to form three tanks A B C, the central tank B of which is the pasteurizing-tank and the tanks A and C the attemperating-tanks. The tanks have pipe connections H (see Figs. 1, 4, and 5) to a water-supply. In operation the water is maintained in the tanks at the level indicated in the drawings by the dotted line E. For initially heating the several baths to their respective operating temperatures the tanks are provided with steam connections J. (See Figs. 1, 4, and 5.) These connections enter the tanks and are there perforated to permit steam to be injected into the water of the tanks and condensed. Ordinarily in practicing my invention the steam connections to the tanks A and C are used only in bringing the baths to the proper temperatures prior to the operation of the machine, after which they are closed, the temperatures of the baths A and C being then automatically maintained, as heretofore described.

For providing communication from tank B to A there is in the partition $b$ (see Figs. 1 and 4) at the water-level an opening $m$, and through this the hot water formed by steam condensing in B passes into tank A. From a point in the tank A just below the water-line a pipe M of large cross-section passes around outside of the tanks and enters the tank C at a point near the bottom thereof. (See Figs. 1, 6, and 7.) Communicating with tank C at the water-level therein (see Fig. 5) is a drip or waste pipe $m^2$, through which hot water from the surface of bath C passes to the sewer or waste through pipe K. For draining the three pipes at will each is provided with a drain-pipe K, controlled by suitable valves.

For feeding the bottled beer expeditiously through the machine I have provided the following means: Extending longitudinally through the three tanks is a way having rails $e^4$. This way or track passes from one tank to the other over the partitions $b$ and $c$ at inclines. On the track is an endless carrier comprised of slats $e$, linked, as at $e'$, (see Figs. 3 and 7,) and engaging the rails $e^4$ by means of rollers $e^3$, with which the links at intervals are provided. The rollers also engage a guard-rail $e^5$, whereby the carrier is maintained properly submerged and on the railway during passage through the water-tanks. From tank C the carrier passes over sprockets $f$ $f'$ $f^2$ $f^3$ and around under the machine to the starting-point at tank A. The sprocket $f$ is the carrier-driving gear and is driven from pulley $F^3$ (see Fig. 7) by means of a worm-gear $F^2$.

In order that the beer, which is conveyed in cases, may be rapidly supplied to the carrier, I provide a roll or idler $g$. The case is slid by the operator over the rolls until it is engaged by the carrier. That the carrier may properly engage the cases and hold them in position during the operation the slats $e$ are at intervals provided with cleats $e^2$, one of which engaging the case from the rear holds it stationary on the carrier in advancing through the baths and up the inclines of the railway, while another cleat in the front of the case prevents it from sliding out of position when going down the inclines. That the carrier may be automatically relieved of the cases after passage through tank C there is provided a second set of rollers or idlers $d'$, (see Fig. 7,) over which the cases are slid by the action of the carrier, as illustrated.

The operation of my machine is as follows: The tanks are first filled with cold water through the pipes H to the level E, after which these pipes are closed. The steam-pipes J are then opened to heat the water in the pasteurizing-tank B to a temperature of 160° Fahrenheit or over and the water in the tanks A and C each to a temperature of about 90°. The steam-pipes to the tanks A and C are then closed and the steam-pipe to the tank B adjusted to supply heat to maintain the baths at the proper temperatures during the pasteurizing process. The baths being thus prepared the process is commenced by the operator starting a case upon the carrier by sliding the same over the roller $g$. The case thus fed to the carrier is engaged by a cleat $e^2$ and fed forward into the bath A. Here the beer in the case is heated to a temperature of about 90° and in turn the bath is slightly cooled by the beer. Passing from tank A the case now enters the bath B, where the temperature of the beer is raised to at least 160° Fahrenheit and the beer pasteurized, this bath being also slightly cooled by the beer. The slight cooling effect of the beer is, however, immediately corrected by the steam constantly injected into tank B and there condensed, this condensation, as stated, causing an overflow from B to A, thus raising the temperature of A to the temperature had before the entrance therein of the beer, whereupon, in turn, there is caused an overflow of the slightly-cooled water through connection $m$ to tank C. The beer at 160° passing on from tank B to tank C is there cooled to about 90°. The tendency of the hot bottles on entering C from B to raise the temperature of bath C is counteracted by the cool water coming from A, which entering the bottom of the tank C is diffused upward, causing an overflow of warm water from the surface of the bath through the pipes $m'$ $m^2$ to the sewer. The case then emerging from tank C is slid by the movement of the carrier over the rollers $d'$ to an operator at that end of the machine.

As case after case is started into the machine by the first operator the process above is automatically and continuously repeated. After the quantity of beer desired to be pasteurized has been so treated the tanks may be drained and cleaned through the pipes K by opening the valves therein.

Having thus fully described my invention, what I claim, and desire to secure by Letters Patent, is—

1. In an apparatus of the kind described, the combination of three tanks located in line, the tank at one end to contain an attemperating-bath, the tank at the other end to contain a cooling-bath, and the intermediate tank to contain a hot bath, said intermediate bath being in communication with the attemperating-bath, means for heating said intermediate bath, and a conveyer suitably mounted to travel through said tanks consecutively, and means for connecting the first and last tanks in series, whereby the temperatures and level of the baths in said tanks will be equalized.

2. In an apparatus of the kind described, the combination of three tanks located in line, the intermediate of said three tanks connecting with the first of said other tanks, a conveyer suitably mounted to travel through said tanks consecutively, and a pipe connecting the end tanks, said tank connections permitting of a flow for maintaining constant temperature and bath-level in said tanks, as and for the purposes set forth.

3. In an apparatus of the kind described, three or more tanks located in line, means whereby they may be filled with water and means whereby said water may be heated, and a conveyer suitably mounted to travel through each of said tanks in turn, and means whereby said conveyer is moved, in combination with a pipe connecting the end tanks and provision for an overflow from the pasteurizing-tank to the first tank, as set forth.

4. In an apparatus of the kind described, a series of tanks located in line, a conveyer passing through each of said tanks in turn, a pipe connecting the end tanks, an overflow connecting the pasteurizing-tank with the first of said tanks, and a drip connecting the last of said tanks with a suitable waste, and means whereby said tanks are filled with water, and the temperature of the water therein regulated, as and for the purpose set forth.

5. In an apparatus of the kind described, three tanks located in line, in combination with means for heating the intermediate water-tank to have a higher degree of temperature than the end water-tanks, means for connecting the first and last tanks in series, said intermediate tank being connected with the first of said other tanks, and a conveyer adapted to travel through said tanks consecutively, the said conveyer consisting of two endless chains to form a substantially continuous flexible floor, a series of friction-rolls located to support said endless floor, certain of the slats forming said floor being provided with cleats adapted to hold the case from sliding thereon while going up and down grade whereby a case of any dimensions less than the width of said conveyer and the distance of its cleats may be supported upon said floor and carried through said tanks, and the contents of cases may be subjected to a substantially equal temperature in said end tanks and a higher degree of temperature in said intermediate tank, as described.

6. In an apparatus of the kind described, the combination of a series of water-tanks located in line, means for controlling the temperature of each tank whereby the temperature of the intermediate tank will be higher than the temperature of the two end tanks, communicating means for the water between the two end tanks, said intermediate tank being connected with the first of said end tanks, a conveyer adapted to travel through said tanks consecutively and a support located at the receiving end of said conveyer and provided with a roll in close proximity to said conveyer whereby a case resting on said support and said conveyer will be drawn off from said support and carried through said tank by frictional contact of the entire bottom of said case with said floor, as and for the purposes described.

7. In a pasteurizer, the combination of an attemperating-tank, a cooling-tank, a sterilizing-tank in communication with the attemperating-tank, means for moving the substance to be sterilized from one tank to another, communicating means for the water between the attemperating-tank and the cooling-tank, and means for maintaining the bath in the sterilizing-tank at a higher temperature than the baths in the other tanks.

8. In a pasteurizer, the combination of an attemperating-tank, a cooling-tank, a sterilizing-tank in communication with the attemperating-tank, means for moving the substance to be sterilized from one tank to another, means for heating the bath in the attemperating and cooling tanks, communicating means for the water between the two last-mentioned tanks, means for maintaining the bath in the sterilizing-tank at a higher temperature than the baths in the other tanks.

9. In a pasteurizer, the combination of an attemperating-compartment, a sterilizing-compartment, a cooling-compartment, communicating means for the water exterior of said compartments between the attemperating-compartment and cooling-compartment, said means being without communication with the sterilizing-compartment, and means carrying the substance to be sterilized through said compartments.

10. In an apparatus of the kind described, a pasteurizing-bath, an attemperating-bath at one side thereof, a cooling-bath at the other side thereof, said attemperating and cooling baths being in direct communication with each other, and said attemperating-bath being in communication with the pasteurizing-bath, substantially as described.

11. In an apparatus of the kind described, a pasteurizing-bath, an attemperating-bath at one side thereof, a cooling-bath at the other side thereof, said attemperating and cooling baths being in direct communication with each other, and said attemperating-bath being in communication with the pasteurizing-bath, a fluid-waste drip for said cooling-bath and a fluid-inlet for the pasteurizing-bath, substantially as described.

12. In an apparatus of the kind described, a pasteurizing-bath, an attemperating-bath at one side thereof, a cooling-bath at the other, communicating means for the liquid between said attemperating and cooling baths, and between said attemperating-bath and the pasteurizing-bath substantially as described.

In witness whereof I have hereunto set my name this 18th day of July, 1899.

CHARLES A. KING.

Witnesses:
 GEORGE O. G. COALE,
 E. A. GUILD.